March 2, 1943. H. V. BOWMAN 2,312,621
CRATE
Filed Aug. 18, 1939 3 Sheets-Sheet 1

INVENTOR
HENRY V. BOWMAN
BY Paul, Paul Moore Hine
ATTORNEYS

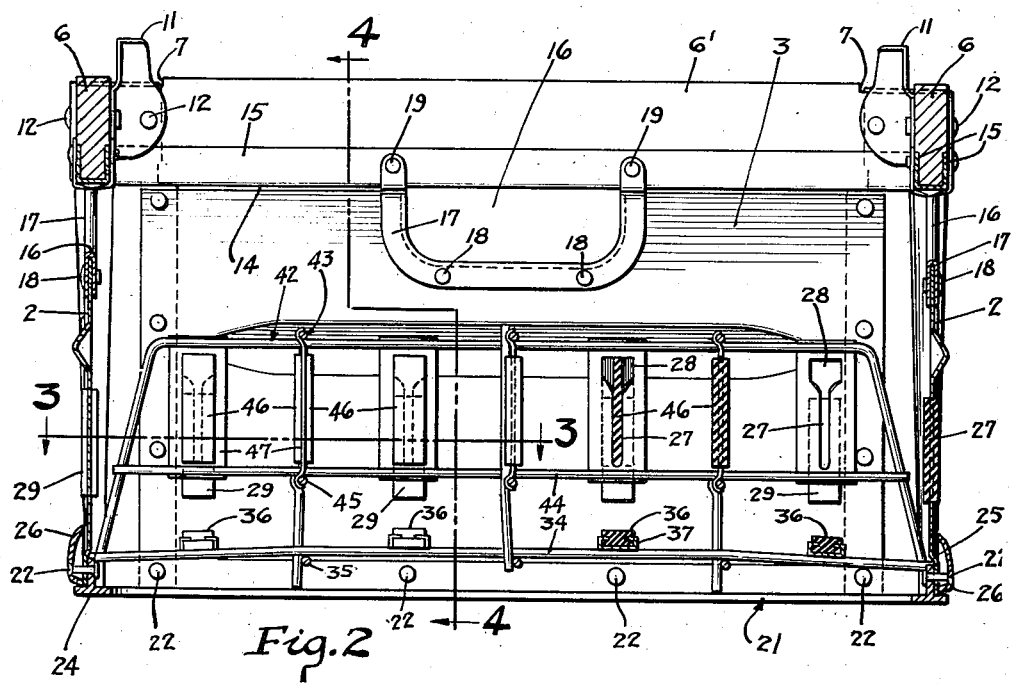
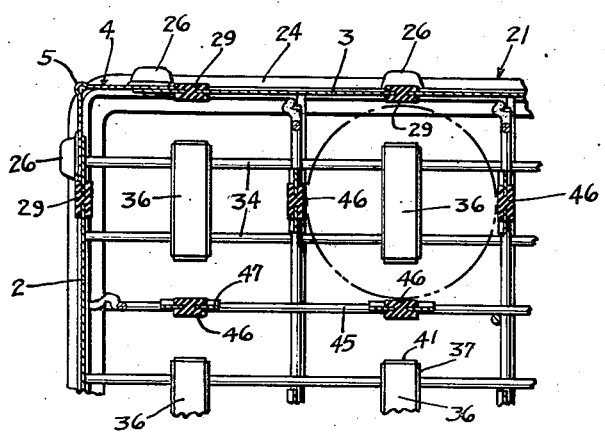
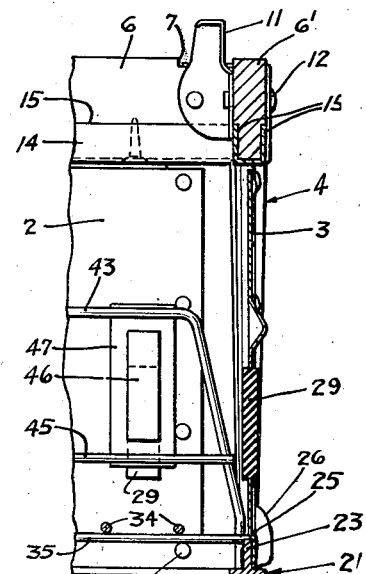
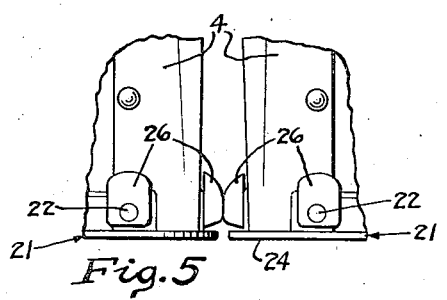

March 2, 1943.   H. V. BOWMAN   2,312,621
CRATE
Filed Aug. 18, 1939   3 Sheets-Sheet 3

INVENTOR
HENRY V. BOWMAN
BY Paul, Paul Moore Spiers
ATTORNEYS

Patented Mar. 2, 1943

2,312,621

UNITED STATES PATENT OFFICE 2,312,621

CRATE

Henry V. Bowman, Minneapolis, Minn.

Application August 18, 1939, Serial No. 290,835

2 Claims. (Cl. 220—71)

This invention relates to new and useful improvements in crates generally, and more particularly to a novel metal bottle crate of the character used by creameries and milk distributors, for transporting dairy products, although it is to be understood that it may be used for other products, where applicable.

In the operation of a creamery or milk distributing plant, it is of utmost importance that the crates or containers, in which the bottled milk and cream are transported, be maintained clean and sanitary. Wooden containers or crates, such as are now quite generally used by the trade, are objectionable because of the inherent tendency of the wood fibres to absorb moisture, such as milk, cream, or butter fat. It has been found extremely difficult to treat the slats of a wooden crate, whereby they will be moisture-proof because of the cleaning process to which these crates are usually subjected. Bottle crates used for transporting milk to the trade, are frequently passed through a steam chamber for cleaning and sterilizing, daily, which has a very devastating effect upon preservatives which may have been used in the treatment of the wood used in the crates.

To simplify the cleaning and sterilizing problem, attempts have heretofore been made to construct milk crates of sheet metal, in order to simplify the operation of cleaning, and to render the crates more sanitary. Metallic crates, as now commonly constructed have some drawbacks, first, in that they are usually very noisy when filled with bottles; secondly, they are heavy and awkward to handle; and third, they are more or less expensive to manufacture.

The novel crate herein disclosed has been designed with a view of eliminating the objectionable features now commonly present in conventional metallic crates. Its walls are so constructed and united at the corners of the crate as to provide a very rigid structure, and the lower edges of the crate walls are reinforced by a suitable supporting rail which also provides the sole support for the grid, and whereby the grid may be assembled as a unit, independently of the crate walls, to facilitate manufacture.

It is, therefore, an object of the present invention to provide a metal bottle crate which readily lends itself to manufacture at low cost, and which is so constructed as to provide a very rigid and substantial structure.

A further object of the invention resides in the means provided for cushioning the bottles in the crate, such means comprising vertically disposed T-shaped slots formed in the walls of the crate, and having suitable elongated rubber elements removably supported therein, said rubber elements having portions projecting into the crate adapted to be engaged by the bottle, thereby to prevent direct contact of the bottles with the metallic walls of the crate.

A further object resides in the novel construction of the bottom portion of the crate, which comprises a bottom rail, preferably T-shaped in cross section, and having its intermediate leg vertically disposed and to which the lower edges of the walls are secured, and whereby a relatively wide ground engaging surface is provided by the horizontal web of the rail for supporting the crate.

A further object resides in the unique construction of the grid which comprises a plurality of rods arranged in crossed relation to provide separators for the bottles, and said rods having their terminals suitably secured to the T-shaped rail at the bottom of the crate, whereby said rail provides the sole support for the grid and becomes, in effect, an integral part thereof, and also whereby the grid may be assembled as a unit, independently of the walls of the crate.

Other objects of the invention reside in the novel construction of the corners of the crate which includes corner irons having vertically disposed reinforcing beads formed therein for strengthening the corner irons against impact; in the construction of the bottom rail of the crate, which is T-shaped in cross section and has a horizontal flange projecting outwardly beyond the outer surfaces of the crate walls to protect said walls against damage, and a plurality of bumper elements being secured to the lower edges of said walls directly over said projecting flange adapted to prevent said flanges of adjacently disposed crates from overlapping, when the crates are placed close together; in the novel construction of the cushion elements provided on the crate walls and the grid, whereby said elements may be removed when necessary; and, in the general construction of the crate, including the hand gripping portions thereof, and the constructional details of the crate in general, whereby it readily lends itself to manufacture in quantity production at small cost, and whereby the crate may readily be kept clean and sanitary with a minimum of labor.

Other objects of the invention will appear from the following description and accompanying drawings and will be pointed out in the annexed claims.

In the accompanying drawings there has been disclosed a structure designed to carry out the various objects of the invention, but it is to be understood that the invention is not confined to the exact features shown as various changes may be made within the scope of the claims which follow.

In the drawings:

Figure 2 is a vertical sectional view of Figure 1, showing the grid in position in the crate;

Figure 3 is a detail sectional view on the line 3—3 of Figure 2, showing the arrangement of the cushion elements;

Figure 4 is a detail sectional view on the line 4—4 of Figure 2;

Figure 5 is a fragmentary view showing the bumper elements provided for preventing the lower projecting flanges of adjacent crates from overlapping when the crates are placed close together;

Figure 1:
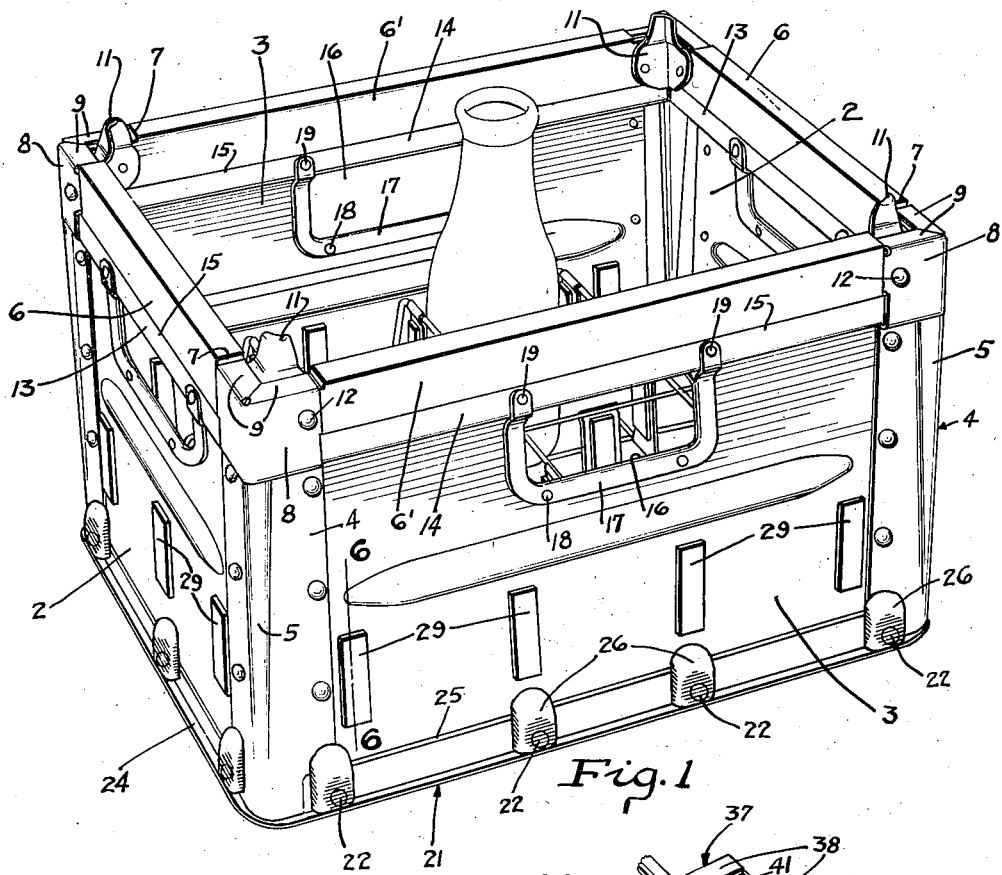
Figure 1 is a perspective view of my improved crate.

The novel crate herein disclosed, is shown comprising end walls 2—2 and side walls 3—3, secured together at the corner of the crate by suitable corner irons, generally indicated by the numeral 4. These corner irons 4 are made of sheet metal and are angular in cross section, as clearly illustrated in Figures 1 and 3. Each corner iron is formed with a tubular reinforcing bead or rib 5, which serves to strengthen the corners of the crate against impacts and thus prevent distortion of the crate walls, when subjected to rough usage.

A feature of the invention resides in the construction of the upper portions of the metallic walls 2 and 3 of the crate, whereby the walls are greatly strengthened. To thus reinforce the walls, suitable reinforcing bars or slats 6 and 6' are provided which constitute the upper edges of the crate walls, when the crate is completed. The bars or slats 6 and 6' are preferably made of a suitable hard wood and have their ends recessed, as shown at 7 in Figures 1 and 2, to receive suitable corner pieces 8. The corner pieces 8 are of angular cross section, and having their upper portions 9 bent inwardly and seated in the recesses 7, as clearly illustrated in Figure 1. Stacking lugs 11 are seated against the inner faces of the slats 6 and 6' at the corners of the crate, and are secured in place by suitable rivets 12, received in alined apertures provided in the corner pieces 8, slats 6 and 6', and the stacking lugs 11, whereby all of these parts are rigidly secured together.

To further strengthen the upper portions of the crate walls, the slats 6 and 6' are provided at their lower edges with U-shaped reinforcing elements 13 and 14, respectively, preferably having their upright legs 15 received in recesses provided in the opposite faces of the slats, as best shown in Figures 2 and 4. The U-shaped reinforcing members 13 and 14 are snugly fitted over the lower edges of their respective slats, and have their ends received in the corner piece 8, as best shown in Figure 1, and traversed by the rivets 12, whereby they greatly strengthen the crate walls, as will readily be understood.

In the crate, as shown in Figure 1, each wall is provided with a hand opening 16, bounded by a metallic reinforcing member 17. The reinforcing members 17 are riveted to their respective walls by suitable rivets 18, as best illustrated in Figure 2, and their upper ends are forked to fit over the U-shaped reinforcing elements 13 and 14 of the crate walls, to which they are secured by suitable rivets 19. The reinforcing members 17 secure the intermediate portions of the walls of the crate to the intermediate portions of the U-shaped reinforcing elements of the slats, whereby when a loaded crate is lifted by engaging the slats over the hand holes 16, the weight of the load will be distributed uniformly over the crate walls, whereby the crate is greatly strengthened.

Figure 8:
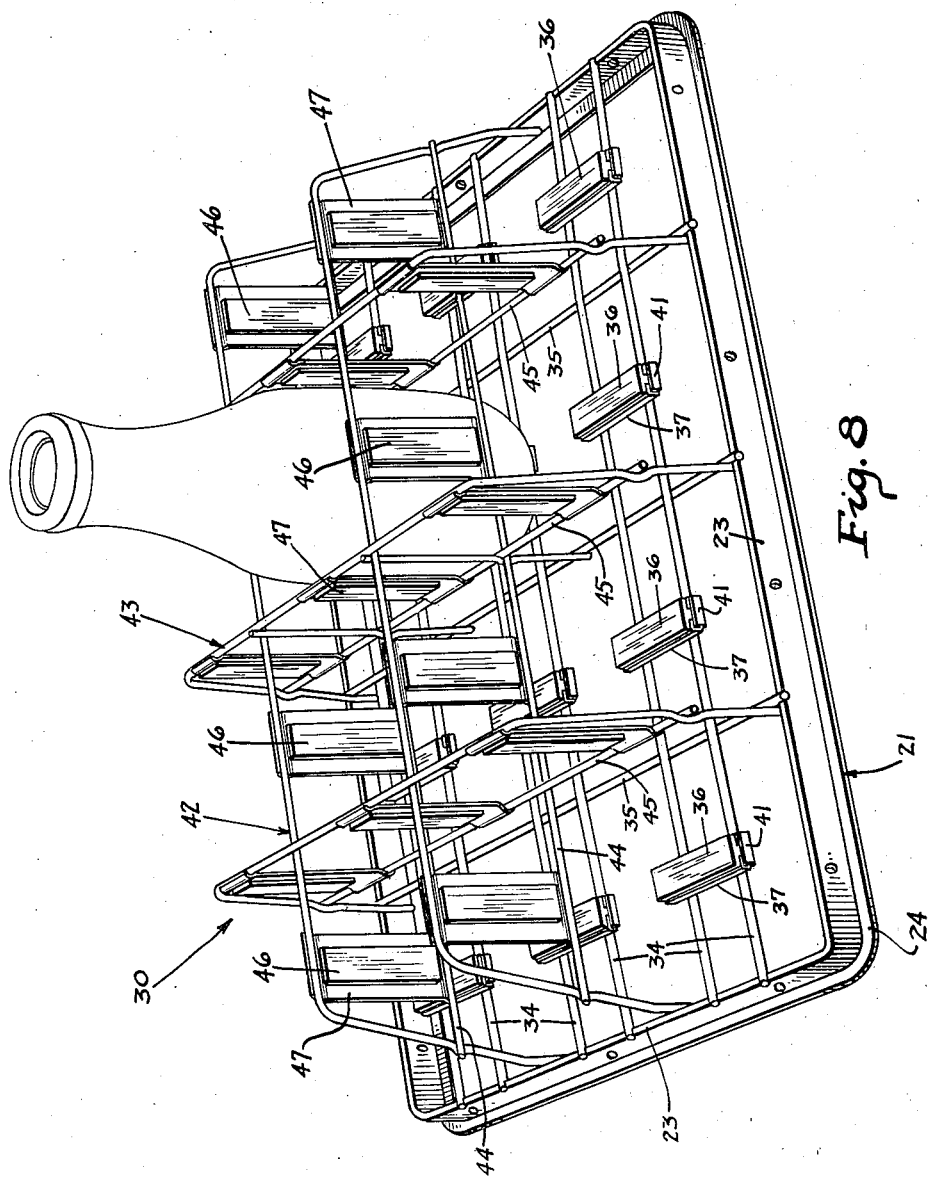
Figure 8 is a perspective view of the grid assembly removed from the crate.

Another feature of the invention resides in the novel construction of the bottom of the crate, whereby the lower edges of the crate walls are reinforced and strengthened against buckling, when subjected to a blow. As best shown in Figures 2, 4, and 8, a suitable rail member, generally indicated by the numeral 21, is secured to the lower edges of the walls of the crate by suitable rivets 22, some of which pass through the corner irons 4, as will readily be understood by reference to Figure 1. The bottom rail 21 is T-shaped in cross section, and is positioned with its intermediate or center leg 23 extending upwardly, whereby the horizontal web 24 of the rail provides a relatively wide floor engaging surface, as clearly illustrated in Figures 2 and 4. The end and side walls 2 and 3 have their lower marginal edge portions slightly offset, as shown at 25, and are secured to the upright leg 23 of the rail 21, by the rivets 22, as will readily be understood by reference to Figure 2. By thus securing the walls to the upright leg of the bottom rail 21, the horizontal flange 24 of the rail will project beyond the outer surface of the walls and thereby protect the walls against damage, should the lower portion of the crate impinge against or contact a relatively fixed object.

Crates of the character herein disclosed, when used in creameries for transporting milk bottles, are frequently placed in abutting relation on the floor, and it is therefore desirable that means be provided whereby the projecting portions of the horizontal flanges 24 of the bottom rails 21 cannot become seated upon one another, which might interfere with lifting the crates from the floor. To eliminate this difficulty, suitable bumper elements 26 are secured to the outer surfaces of the walls of the crate adjacent to the bottom rail 21, as shown in Figure 5. To facilitate manufacture, the bumper elements 26 are shown secured in place by the rivets 22 which secure the bottom edges of the walls to the upright leg 23 of the bottom rail 21. The outermost surfaces of the bumper elements 26 preferably project slightly beyond the outer edges of the horizontal flanges 24 of the rail 21, whereby said flanges cannot become seated upon one another, even though the bumper elements of adjacent crates may be so disposed that they will not contact with one another, when the crates are placed in abutting relation. See Figure 5, Another feature of the invention resides in the means provided for preventing the bottles from contacting directly with the metallic walls of the crate, to eliminate noise and which means also serves to cushion the bottles, when they contact with the walls of the crate. To thus prevent the bottles from directly contacting with the walls of the crate, a plurality of T-shaped slots 27, each provided with a T-shaped head 28, are provided in the four walls of the crate, as best shown in Figure 2. These slots are preferably vertically disposed, and are adapted to receive suitable resilient cushion elements 29, preferably of rubber and having grooves 31 in their longitudinal edges, as clearly illustrated in Figure 7. The grooves 31 in the cushion elements 29 are adapted to receive the side walls of the lower restricted portions of the slots 27, and permit the cushion elements to be readily inserted into said slots through the enlarged openings 28 provided in the upper ends of the slots, as clearly illustrated in Figure 7. The wall portions 32 of the slots are preferably slightly deformed or bent to facilitate inserting the cushion elements into the slots 27, as will readily be understood by reference to Figure 7. The offset wall portions 32 also function to lock the cushion elements in the slots 27, when inserted therein, as shown by the dotted lines 33 in Figure 6. The cushion elements 29 are so positioned in the walls of the crate, that they are alined with the bottles to be supported therein.

Another feature of the invention resides in the novel construction of the grid provided at the bottom of the crate for supporting the bottles in spaced relation. As best shown in Figure 8, the grid generally designated by the numeral 30, comprises a plurality of horizontally disposed rods 34 which extend lengthwise of the crate, and have their terminals suitably secured to the upper edge of the upright web 23 of the bottom rail 21, by such means as welding. Relatively shorter rods 35 are disposed in cross-wise relation to the rods 34, and have their terminals similarly secured to the upper edge of the web 23 of the rail 21. The cross rods 35 pass under the rods 34 and provide a support therefor, to prevent the rods 34 from deflecting, when a bottle is placed thereon. It is to be understood that the rods 34 provide, in effect, the sole supporting means for the bottles, when placed in the crate.

Figures 6, 7, 9:
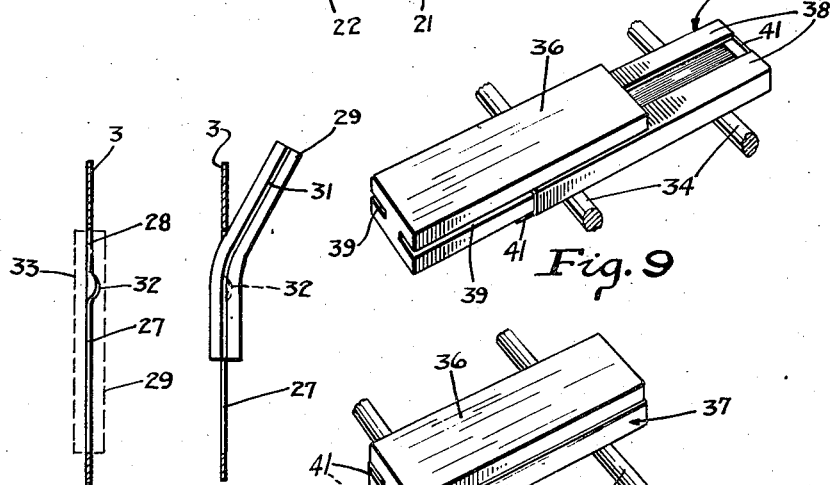
Figure 6 is a detail sectional view on the line 6—6 of Figure 1, showing one of the T-shaped slots with the cushion element removed therefrom.
Figure 7 is a view similar to Figure 6, showing a cushion element being inserted into one of the T-shaped slots.
Figure 9 is a perspective view on an enlarged scale, showing the means for supporting the cushion elements on the bottom rods of the grid.
Figure 10:
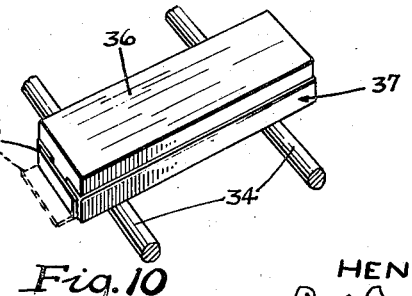
Figure 10 is a view similar to Figure 9, showing one of the bottom cushion elements in place in its supporting means.

Cushion elements 36, best shown in Figures 9 and 10, are secured to the rods 34 to prevent the bottoms of the bottles from contacting directly with the rods. The cushion elements 36 are similar to the cushion elements 29 of the walls of the crate, and are supported in suitable box-like holders 37, secured to the rods 34. The holders 37 are preferably made of sheet metal and have inwardly turned flanges 38 adapted to be received in slots or grooves 39 provided in the side edges of the cushion elements 36. To prevent the cushion elements 36 from becoming separated from the holders 37, the holders are provided with suitable end walls 41, one of which is bent outwardly, as shown in full lines in Figure 9 and dotted lines in Figure 10, to permit the cushion element to be inserted into the holder. When the element 36 is in the position shown in Figure 10, the outwardly bent end wall 41 may be bent into the full line position, shown in Figure 10, whereby the cushion element is retained in the holder and cannot become detached therefrom.

To separate the bottles from one another, suitable separators, generally indicated by the numerals 42 and 43, are provided on the grid 30, as shown in Figure 8. These separators are preferably made of wire or rods arranged in crosswise relation, as shown in Figure 8, and suitably secured together to provide a unitary structure. The ends of the upper rods of the separators 42 and 43 are bent downwardly and secured to the bottom rail member 21, and the rods 44 and 45 of the separators 42 and 43, respectively, are secured to the downwardly bent end portions of the upper rods of the separators. By thus securing the rods of the separators to the rail member 21, a very rigid and substantial grid structure is provided, which may be assembled independently of the crate. In other words, the grid may be made independently of the walls of the crate and is supported entirely by the bottom rail member 21, as will readily be understood by reference to Figures 2 and 8.

Suitable cushion elements 46 are secured to the separators 42 and 43 of the grid to prevent the bottles from contacting directly with the rods of the grid, as will readily be understood by reference to Figure 8. The cushion elements 46 are supported by suitable plate elements 47, secured to the upper and lower rods of the separators, and which have suitable T-shaped slots therein, similar to those provided in the walls of the crate for receiving the elements 46, as will readily be understood.

The novel crate herein disclosed, has been found very practical in actual use, and is comparatively simple to manufacture in quantity production. The cushion elements 29, 36 and 46, prevent glass-to-metal contact between the bottles and the crate, and also prevent marring the surfaces of the bottles, which are very desirable features. By constructing the grid, as shown in Figure 8, the grid may readily be removed from the crate, as a unit, by simply removing the rivets 22, which secure the rail 21 to the lower portions of the walls of the crate. The manufacture of the crate is facilitated by supporting the grid entirely upon the lower rail 21, as shown in Figures 2 and 8, and its construction is such that it readily lends itself for cleaning with standard cleaning and sterilizing equipment.

I claim as my invention:

1. A box comprising a plurality of walls, corner irons securing together said walls at the corners of the box and extending substantially the full height of the walls, each corner iron being formed from a single blank of sheet metal bent to provide a pair of right angularly disposed legs, the upper portion of each leg of the blank being offset in an outward direction to provide an inwardly facing recess of right angle cross-section, wall-strengthening slats constituting the upper edges of the box walls and having their ends received in said recesses, and a longitudinal reinforcing bead being formed at the corner of each angle iron between the legs thereof, said bead gradually increasing in size from the bottom of the box toward the top thereof, said slats and corner irons cooperating to support and protect the box walls against abnormal loads imposed on the top of the box.

2. A box comprising a plurality of walls, corner irons securing together said walls at the corners of the box and extending substantially the full height of the walls, each corner iron being formed from a single blank of sheet metal bent to provide a pair of right angularly disposed legs, the upper portion of each leg of the blank being offset in an outward direction to provide an inwardly facing recess of right angle cross-section, wall-strengthening slats constituting the upper edges of the box walls and having their ends received in said recesses, and a longitudinal reinforcing bead being formed at the corner of each angle iron between the legs thereof and extending downwardly from said offset portion and terminating short of the lower end of said corner iron, said slats and corner irons cooperating to support and protect the box walls against abnormal loads imposed on the top of the box.

HENRY V. BOWMAN.